US010164513B1

(12) United States Patent
Lin et al.

(10) Patent No.: US 10,164,513 B1
(45) Date of Patent: Dec. 25, 2018

(54) METHOD OF ACQUIRING INPUT AND OUTPUT VOLTAGE INFORMATION

(71) Applicant: INNO-TECH CO., LTD., Taipei (TW)

(72) Inventors: Chih-Feng Lin, Taipei (TW); Shu-Chia Lin, Taipei (TW); Ching-Yuan Lin, Taipei (TW); Wen-Yueh Hsieh, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 16/104,910

(22) Filed: Aug. 19, 2018

(30) Foreign Application Priority Data

May 24, 2018 (TW) ............................ 107117699 A

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33507* (2013.01); *H02M 2001/0009* (2013.01)

(58) Field of Classification Search
CPC ......... H02M 3/33507; H02M 3/33515; H02M 3/33576; H02M 3/33523; H02M 3/28; H02M 3/315; H02M 3/335; H02M 1/08; H02M 2001/0009; H02M 7/515; H02M 7/53; H02M 7/537; H02M 7/538466; H02M 7/757
USPC ......... 363/21.12, 21.13, 21.14, 21.15, 21.16, 363/21.17, 21.18, 95, 97, 131
See application file for complete search history.

(56) References Cited

U.S. PATENT DOCUMENTS 9,069,020 B2 * 6/2015 Fahlenkamp .......... G01R 22/06
9,602,006 B2 * 3/2017 Fahlenkamp ..... H02M 3/33507
2008/0192515 A1 * 8/2008 Huynh ............. H02M 3/33507 363/21.12
2008/0259654 A1 * 10/2008 Huynh ............. H02M 3/33523 363/21.16
2008/0259655 A1 * 10/2008 Wei ....................... H02M 3/335 363/21.18
2010/0208500 A1 * 8/2010 Yan .................. H02M 3/33523 363/21.12
2014/0160801 A1 * 6/2014 Stamm .............. H05B 33/0815 363/21.01
2014/0252989 A1 * 9/2014 Knoedgen ......... H02M 3/33507 315/307
2015/0229223 A1 * 8/2015 Cao .................. H02M 3/33515 363/21.13

(Continued)

*Primary Examiner* — Adolf Berhane
(74) *Attorney, Agent, or Firm* — Lin & Associates Intellectual Property, Inc.

(57) ABSTRACT

Disclosed is a method of acquiring input and output voltage information by employing a pulse width modulation (PWM) controller, which is in collocation with an input power processing unit, a primary inductor, a switch element, a current-sensing resistor, an output rectifier, and an output filter for converting an alternating current input power into an rectified input power and an output power, and the output power supplies an external load. A current-sensing signal is specifically disposed and applied to calculation of the input voltage and output voltage of the rectified input power when the switch element is turned on and off, respectively. Thus, no resistive voltage divider is needed, and power consumption at no load is greatly improved.

8 Claims, 10 Drawing Sheets

10 Vi LP LA Do Vo IL IQ 20 Vac DRV V_DRV Q1 CS V_CS RS Co RL GND

(56) References Cited

U.S. PATENT DOCUMENTS

2016/0149504 A1* 5/2016 Quigley .................. H02M 1/36
363/21.04
2018/0013352 A1* 1/2018 Cao .................. H02M 3/33507

* cited by examiner

METHOD OF ACQUIRING INPUT AND OUTPUT VOLTAGE INFORMATION

CROSS-REFERENCE TO RELATED APPLICATION

This application claims the priority of Taiwanese patent application No. 107117699, filed on May 24, 2018, which is incorporated herewith by reference.

BACKGROUND OF THE INVENTION

1. Field of the Invention

The present invention relates to a method of acquiring input and output voltage information, and more specifically to a method of leveraging current-sensing signal to acquire input and output voltage information for converting an alternating current input power into an output power through a specific algorithm by use of simple calculation performed by a PWM controller without any resistive voltage divider, thereby greatly improving power consumption at no load.

2. The Prior Arts

As semiconductor technology continuously progresses, various electric/electronic devices operate off of a specific operating voltage. For example, ICs (integrated circuits) are supplied with 5V, 3V, or 1.8V DC, DC motors need 12V DC, and high power devices require 110V or 220V AC from AC mains. In particular, the lamp of the LED display usually operates off of a much higher operating voltage. Thus, many kinds of power converters or inverters have been developed to meet those various demands.

In addition, to further improve efficiency of electrical operation, a design of power factor correction (PFC) is introduced into power conversion. One traditional PFC design in the prior arts is shown in FIG. 1. In general, the traditional PFC scheme needs two voltage dividers to detect the input voltage and the output voltage, respectively, to adjust the pulse width modulation (PWM) driving signal for turning on and off the switch element.

As well known for the power converter, a flyback converter, which has the advantage of simpler architecture and wider operating voltage range, is one of the most widely used switching power converters. As a result, the flyback converter is almost omnipresent and ubiquitous in modern electronic devices consuming low to medium power. One typical flyback converter scheme in the prior arts is shown in FIG. 2. The flyback converter also needs two voltage dividers to detect the input voltage and the output voltage, respectively, to adjust the PWM driving signal.

It is apparent that the PFC design and flyback converter needs two voltage dividers, particularly, two resistive voltage dividers, leading to higher power consumption, especially at the condition of no load. Owing to power saving, more strict requirements of power consumption are imposed on the electronic/electric devices, and the resistive voltage divider is really hard to meet the upcoming standard. Therefore, the electronic/electric industry greatly needs a new scheme acquiring the input/output voltage without any resistive voltage divider, thereby overcoming the problems in the prior arts.

SUMMARY OF THE INVENTION

The primary objective of the present invention is to provide a method of acquiring input and output voltage information without any resistive voltage divider for converting an alternating current input power into an output power supplying an external load through a PWM controller in collocation with an input power processing unit, a primary inductor, an auxiliary inductor, a switch element, a current-sensing resistor, an output rectifier, and an output filter.

The input power processing unit receives and converts the AC input power into a rectified input power through rectification and filtration. The PWM controller utilizes a current-sensing signal to obtain related inform about the input voltage of the rectified input power and the output voltage of the output power.

The primary inductor, the switch element, and the current-sensing resistor are connected in series and disposed between the input power processing unit and a ground level. A drain of the switch element is connected to the primary inductor, a gate of the switch element is connected to a PWM driving terminal of the PWM controller, a source of the switch element is connected to a current-sensing terminal of the PWM controller, and the current-sensing resistor is specifically disposed between the source of the switch element and the ground level. Additionally, the output rectifier and the output filter are connected in series, and disposed between the primary inductor and the ground level. The output power is generated at a connection point of the output rectifier and the output filter.

Specifically, the method of the present invention firstly performs an initial step by generating a PWM driving signal to turn on the switch element through the PWM driving terminal. Then, a turn-on current flows from an output terminal of the input power processing unit to the ground level through the primary inductor, the switch element, and the current-sensing resistor. Particularly, the output rectifier is turned off because of being inversely biased. Next, the current-sensing terminal receives a sensed voltage as a current-sensing signal generated by the current-sensing resistor when the turn-on current flows through the current-sensing resistor. After a period of turn-on time, the current-sensing terminal of the PWM controller receives and detects the turn-on current as a peak turn-on current. The peak turn-on current is divided by the turn-on time to obtain an increasing slope of the turn-on current during the period of turn-on time, and the increasing slope is further multiplied by an inductance of the primary inductor to acquire the input voltage. The PWM controller updates the PWM driving signal to turn off the switch element. At this time, a loading current flows from the output terminal of the input power processing unit through the primary inductor, the output rectifier, the output filter, and the load to the ground level. The turn-on current starts to decrease when the switch element is turned off, and the current-sensing signal received by the current-sensing terminal is monitored to determine if the turn-on current drops to zero. The period from the time when the switch element is turned off to the time when the turn-on current is zero is called a zero time. Finally, the peak turn-on current is divided by the zero time to obtain a decreasing slope of the turn-on current, and the decreasing slope is further multiplied by the inductance of the primary inductor and added by the input voltage to acquire the output voltage.

Thus, the method of the present invention acquires the input voltage and the output voltage through simple calculation based on the current-sensing signal when the switch element is turned on or off without any voltage divider, thereby greatly reducing the power consumption at no load and improving efficiency of whole electrical operation.

In other words, the input voltage is detected and calculated through the increasing slope of the current-sensing voltage, and the output voltage is acquired through detecting and calculating the variation of the slope of the auxiliary voltage from the auxiliary inductor. Since no voltage divider is needed any more for the input voltage or the output voltage, power consumption at no load is greatly improved, and the overall efficiency of electrical operation is dramatically increased.

Furthermore, another objective of the present invention is to provide a method of acquiring input and output voltage information, which is performed by a PWM controller in collocation with an input power unit, a transformer, an auxiliary winding, a switch element, a current-sensing resistor, a first rectifier, and an output unit for converting an AC input power into an output power. The transformer comprises a primary winding and a secondary winding, and the output unit at least comprises an output rectifier and an output filter connected in series.

Additionally, the input power unit receives and converts the AC input power into a rectified input power through rectification and filtration, and the primary winding, the switch element, and the current-sensing resistor are connected in series and disposed between the input power unit and the ground level. Also, the first rectifier is connected between the current-sensing terminal of the PWM controller and the source of the switch element, and a connection point of the auxiliary winding and the current-sensing resistor is connected to the ground level. The secondary winding generates an induced current through induction with a current flowing through the primary winding, and particularly, the induced current flows into the output unit such that the output power is generated at the output filter.

First, the method is performed by generating a PWM driving signal to turn on the switch element through the PWM driving terminal of the PWM controller. The turn-on current flows from an output terminal of the input power unit through the primary winding, the switch element, and the current-sensing resistor to a low voltage terminal of the input power unit, that is, the ground level.

Then, the PWM controller receives a sensed voltage as a current-sensing signal generated by the current-sensing resistor, and the sensed voltage is calculated according to a formula specified by $-IQ*RS1$, where IQ represents the turn-on current, and RS1 is resistance of the current-sensing resistor.

The PWM controller further calculates the input voltage of the rectified input power, which is equal to the present sensed voltage. The switch element is then turned off, and the PWM controller receives the auxiliary voltage from the auxiliary winding. Specifically, the auxiliary winding voltage generated by the auxiliary winding through induction of the secondary current flowing through the secondary winding is divided by the first voltage divider and the second voltage divider, and the voltage at the connection point of the first voltage divider and the second voltage divider is identical to the auxiliary voltage.

Finally, the PWM controller calculates the output voltage of the output power based on the formula: $Vout=Va(Toff)-K*Vcs(Toff)$, where Vout is the output voltage, Toff is the time when the switch element is turned off by the PWM driving signal, Va(Toff) is the peak voltage of the auxiliary winding voltage after the time Toff, Vcs(Toff) is the peak voltage at the current-sensing terminal before the switch element is turned off by the PWM driving signal, and K is a constant. More specifically, K is determined by the formula: $WP*WA/WS^2*(RSEC+RCES)/RS1$, where WP is the winding number of the primary winding, WS is the winding number of the secondary winding, and WA is the winding number of the auxiliary winding.

The above method detects and calculates the input voltage by directly sensing the voltage slope (or the current slope), and further detects and calculates the output voltage by using the slope variation of the auxiliary voltage, thereby greatly reducing power consumption at no load, and improving efficiency of electrical operation. Particularly, no voltage divider is needed to detect the input voltage and the output voltage so as to decrease power consumption at no load and increase efficiency of electrical operation.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
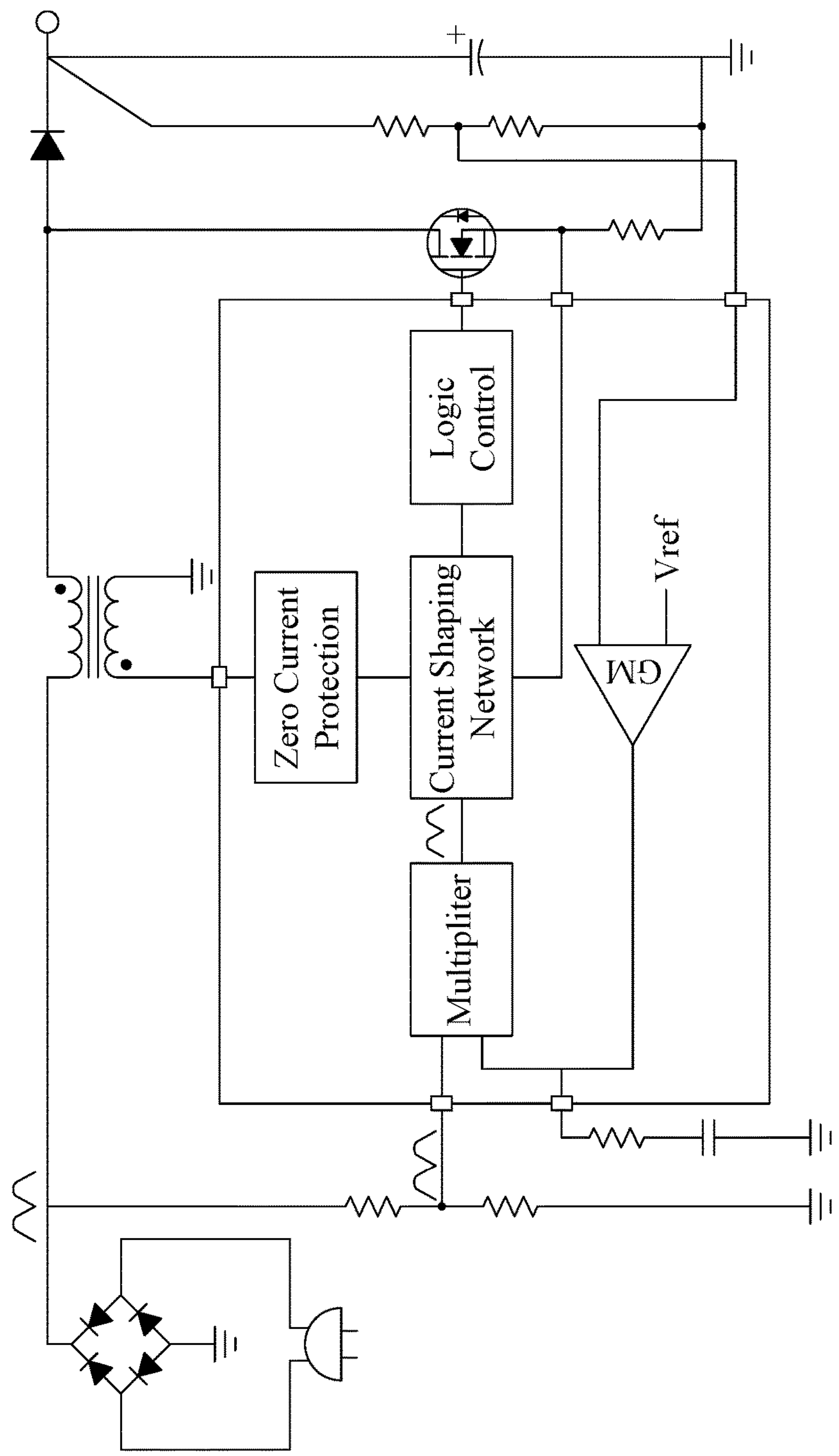
FIG. 1 is a view of a PFC scheme in the prior arts.
Figure 2:
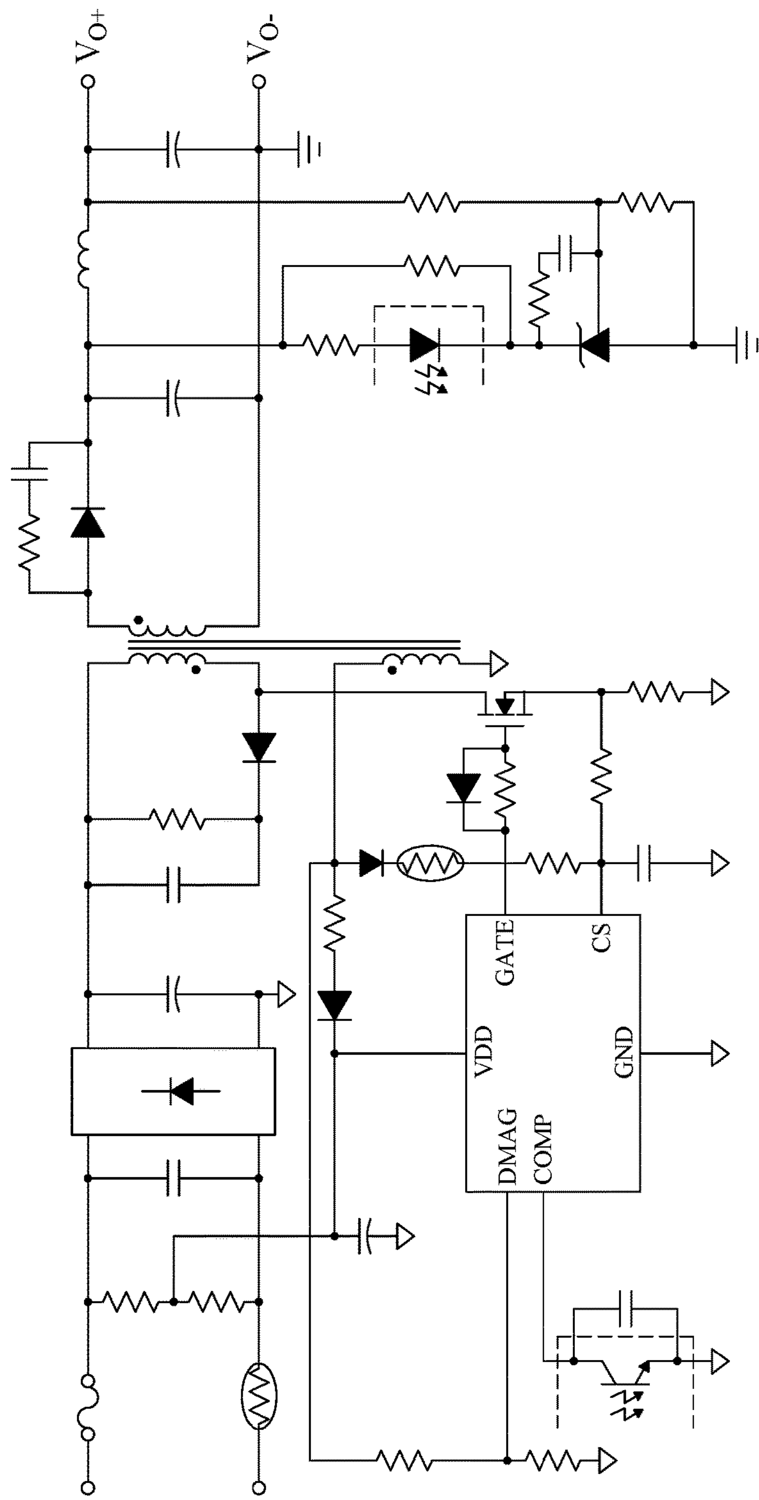
FIG. 2 is a view of a flyback converter scheme in the prior arts.
Figure 3:
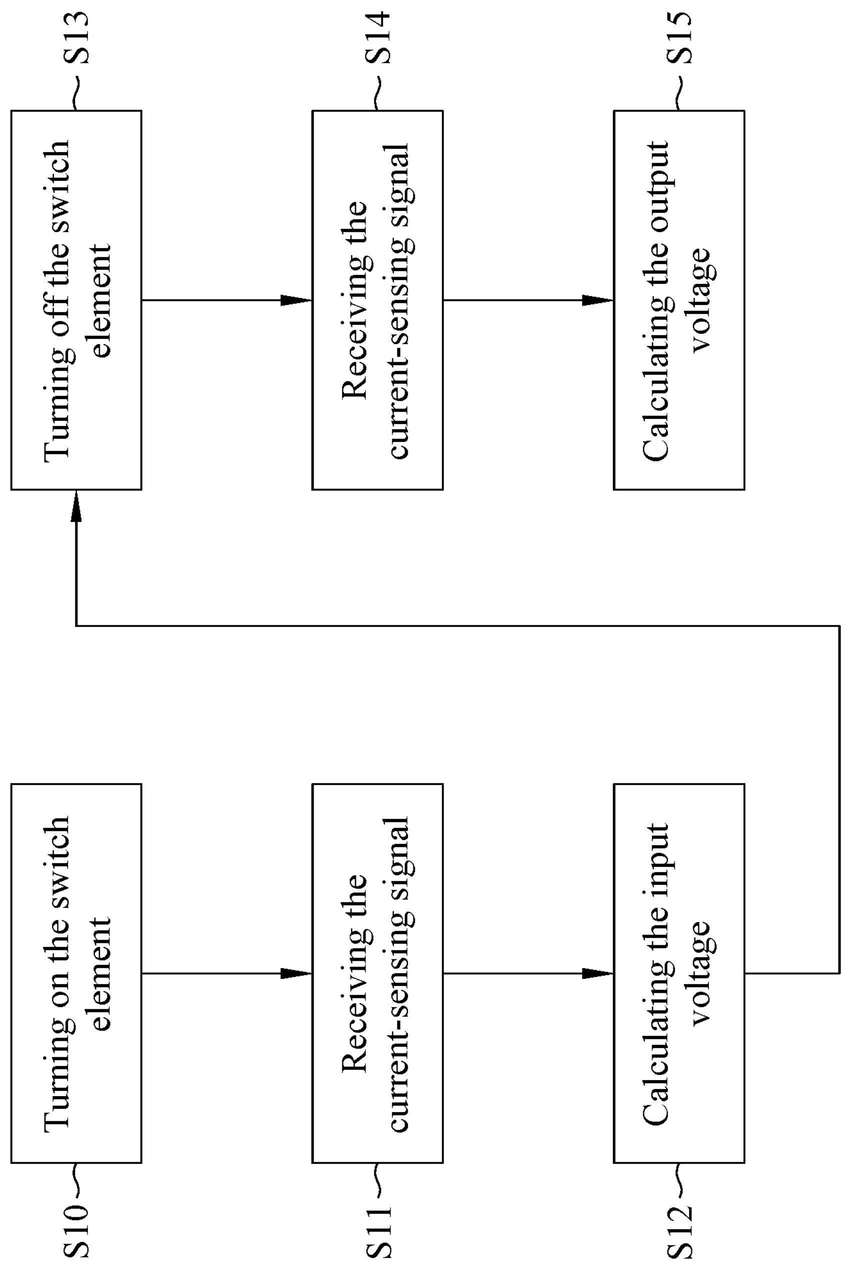
FIG. 3 shows a flowchart of a method of acquiring input and output voltage information according to the first embodiment of the present invention.

Please refer to FIG. 3 showing the operation flowchart of the method of acquiring input and output voltage information according to the first embodiment of the present invention. The method of the first embodiment comprises the steps S10, S11, S12, S13, S14, and S15 to directly acquire the input voltage and the output voltage through simple current sensing and calculation without two resistive voltage dividers in the prior arts for detecting the input voltage and the output voltage, respectively. Particularly, power consumption at no load is greatly reduced.

Figure 4:
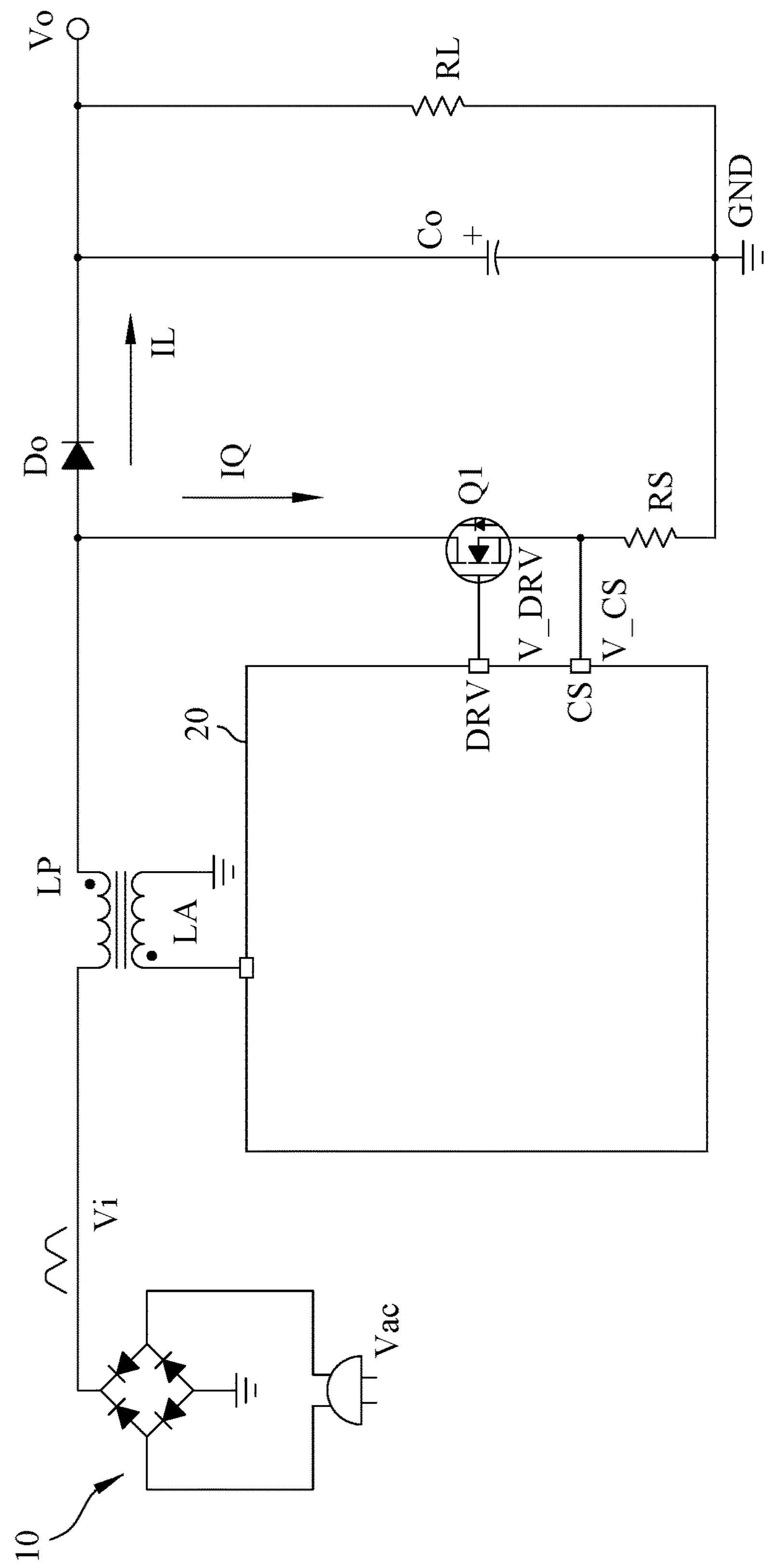
FIG. 4 is one exemplary electrical circuit for implementing the method according to the first embodiment of the present invention.
Figure 5:
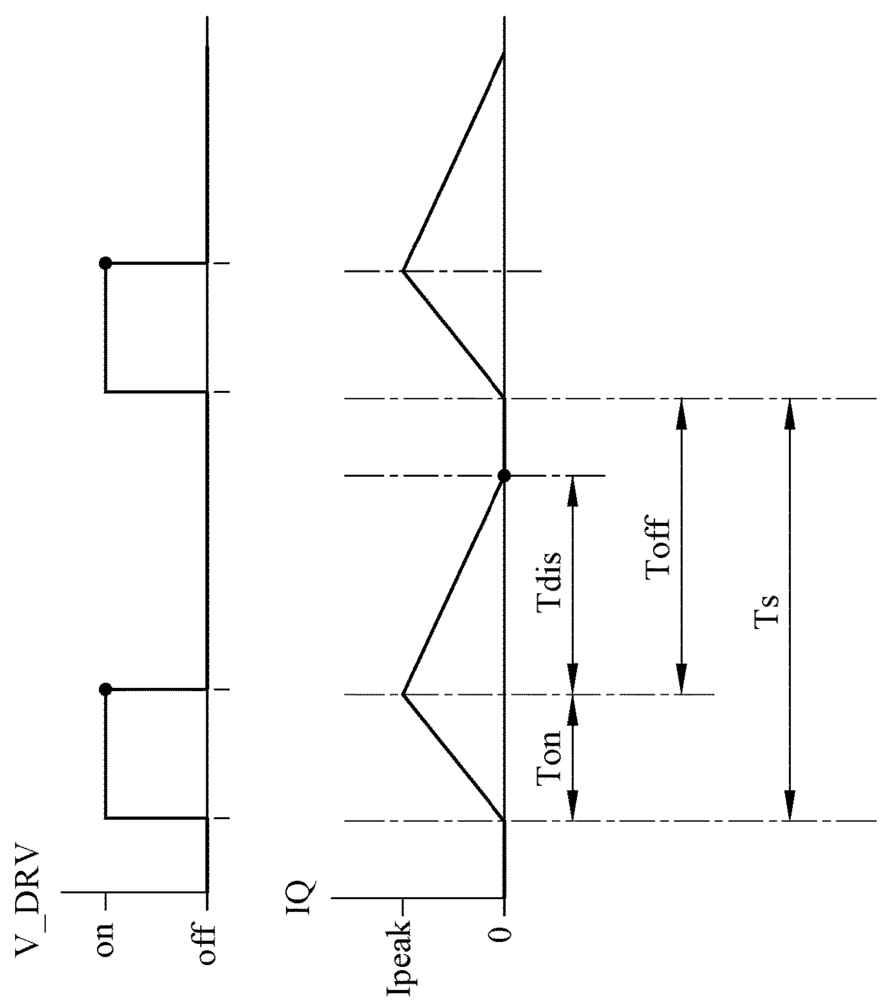
FIG. 5 is one exemplary operation waveform of the method according to the first embodiment of the present invention.

To clearly explain the aspects of the method of the first embodiment of the present invention, please refer to FIGS. 4 and 5. Specifically, FIG. 4 illustrates one exemplary electrical circuit for implementing the method according to the first embodiment of the present invention, and FIG. 5 is one exemplary operation waveform of the method according to the first embodiment of the present invention.

The electrical circuit shown in FIG. 4 substantially comprises an input power processing unit 10, a primary inductor LP, an auxiliary inductor LA, a pulse width modulation (PWM) controller 20, a switch element Q1, a current-sensing resistor RS, an output rectifier Do, and an output filter Co for converting an alternating current (AC) input power Vac into an output power Vo supplying a load RL. In other words, the PWM controller 20 is a core of the electrical circuit in collocation with the input power processing unit 10, the primary inductor LP, the auxiliary inductor LA, the switch element Q1, the current-sensing resistor RS, the output rectifier Do, and the output filter Co, and performs the above steps S10, S11, S12, S13, S14, and S15 to generate a PWM driving signal to turn on/off the switch element Q1. However, it should be noted that the electrical circuit shown in FIG. 4 is a Power factor correction (PFC) circuit as an example, but not intended to limit the scope of the present invention. That is, other similar electrical circuits which needs to detect the input voltage and the output voltage, and operates through PWM driving are also included by the present invention.

Specifically, the input power processing unit 10 receives and converts the AC input power Vac into a rectified input power Vi through rectification and filtration. The primary inductor LP, the switch element Q1, and the current-sensing resistor RS are connected in series and disposed between the input power processing unit 10 and a ground level GND. A drain of the switch element Q1 is connected to the primary inductor LP, a gate of the switch element Q1 is connected to a PWM driving terminal DRV of the PWM controller 20, and a source of the switch element Q1 is connected to a current-sensing terminal CS of the PWM controller 20. Additionally, the current-sensing resistor RS is disposed between the source of the switch element Q1 and the ground level GND, and the output rectifier Do and the output filter Co are connected in series and disposed between the primary inductor LP and the ground level GND. The output power Vo is generated at a connection point of the output rectifier Do and the output filter Co.

In particular, the PWM controller 20 utilizes a current-sensing signal V_CS from the current-sensing resistor RS as a sensed voltage to acquire related inform about an input voltage Vin of the rectified input power Vi and an output voltage Vout of the output power Vo.

More specifically, the method begins at the step S10 as an initial step, in which the PWM controller 20 generates a PWM driving signal V_DRV to turn on the switch element Q1 through the PWM driving terminal DRV. At this time, a turn-on current IQ flows from an output terminal of the input power processing unit 10 to the ground level GND through the primary inductor LP, the switch element Q1, and the current-sensing resistor RS, and the output rectifier is turned off because of being reversely biased.

The step S11 is then performed. The current-sensing terminal CS receives the sensed voltage as a current-sensing signal V_CS generated by the current-sensing resistor RS when the turn-on current IQ flows through the current-sensing resistor RS. Next, in the step S12, the current-sensing terminal CS of the PWM controller 20 receives and detects the turn-on current IQ as a peak turn-on current Ipeak after a period of turn-on time Ton. The peak turn-on current Ipeak is divided by the turn-on time Ton to obtain an increasing slope of the turn-on current IQ during the period of turn-on time Ton, and the increasing slope is further multiplied by an inductance of the primary inductor LP to acquire the input voltage Vin.

In the step S13, the PWM controller 20 updates the PWM driving signal V_DRV to turn off the switch element Q1, and at this time, a loading current IL flows from the output terminal of the input power processing unit 10 to the ground level GND through the primary inductor LP, the output rectifier Do, and the load RL connected to the output filter Co in parallel.

Next, the step S14 is performed. The turn-on current IQ starts to decrease when the switch element Q1 is turned off. The current-sensing signal V_CS received by the current-sensing terminal CS is monitored to determine if the turn-on current IQ drops to zero. Specifically, a period from the time when the switch element Q1 is turned off to the time when the turn-on current IQ is zero is called a zero time Tdis.

Finally, in the step S15, the peak turn-on current Ipeak is divided by the zero time Tdis to obtain a decreasing slope of the turn-on current IQ, and the decreasing slope is further multiplied by the inductance of the primary inductor LP and added by the input voltage Vin to acquire the output voltage Vout.

Thus, the method of the first embodiment utilizes the sensed signal when the switch element is turned on or off to calculate the input voltage and output voltage without any voltage divider, thereby greatly decreasing power consumption at no load and increasing efficiency of electrical operation.

In addition, after the turn-off time Toff when the switch element Q1 is turned off, the method is back to the step S10, and the PWM controller 20 updates the PWM driving signal V_DRV to turn on the switch element Q1. The steps S11, S12, S13, S14, and S15 are repeated as above mentioned. It is obvious that the turn-off time Toff is the time when the PWM driving signal V_DRV turns off the switch element Q1, and the sum of the turn-on time Ton and the turn-off time Toff is equal to a PWM period Ts of the PWM driving signal V_DRV.

Preferably, the above input power processing unit 10 is implemented by but not limited to a bridge rectification device formed of four rectifying diodes, and the switch element Q1 is implemented by but not limited to a power Metal-Oxide-Semiconductor Field Effect Transistor (MOSFET) or a power Bipolar Junction Transistor (BJT). Further, the output rectifier Do is implemented by but not limited to a rectifying diode or a synchronous rectifier, and the output filter Co is implemented by but not limited to an electrical capacitor.

It should be noted that the method of the first embodiment of the present invention can be also applied to the power converter with primary feedback like flayback converter, or other similar circuits which need to detect the input voltage and operate by means of PWM.

Figure 6:
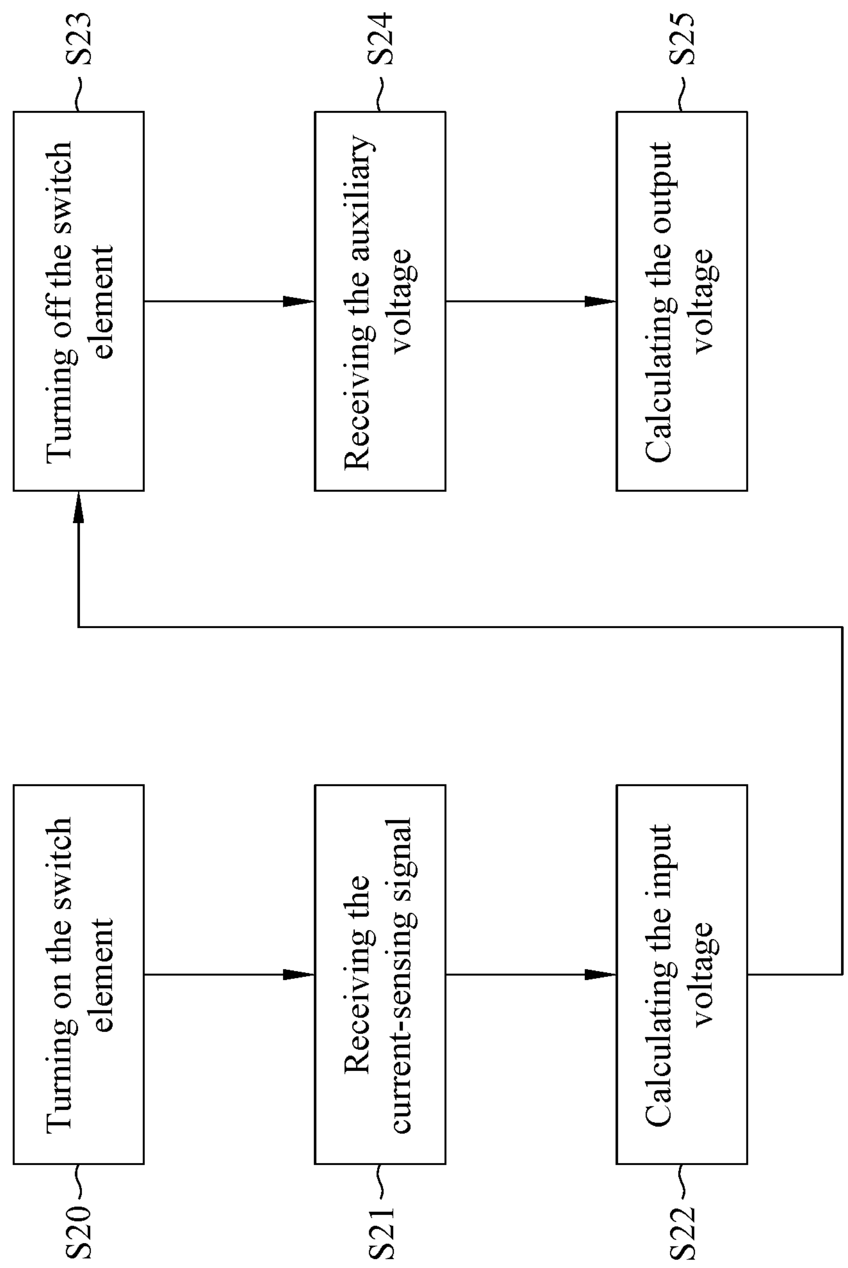
FIG. 6 shows a flowchart of a method of acquiring input and output voltage information according to the second embodiment of the present invention.
Figure 7:
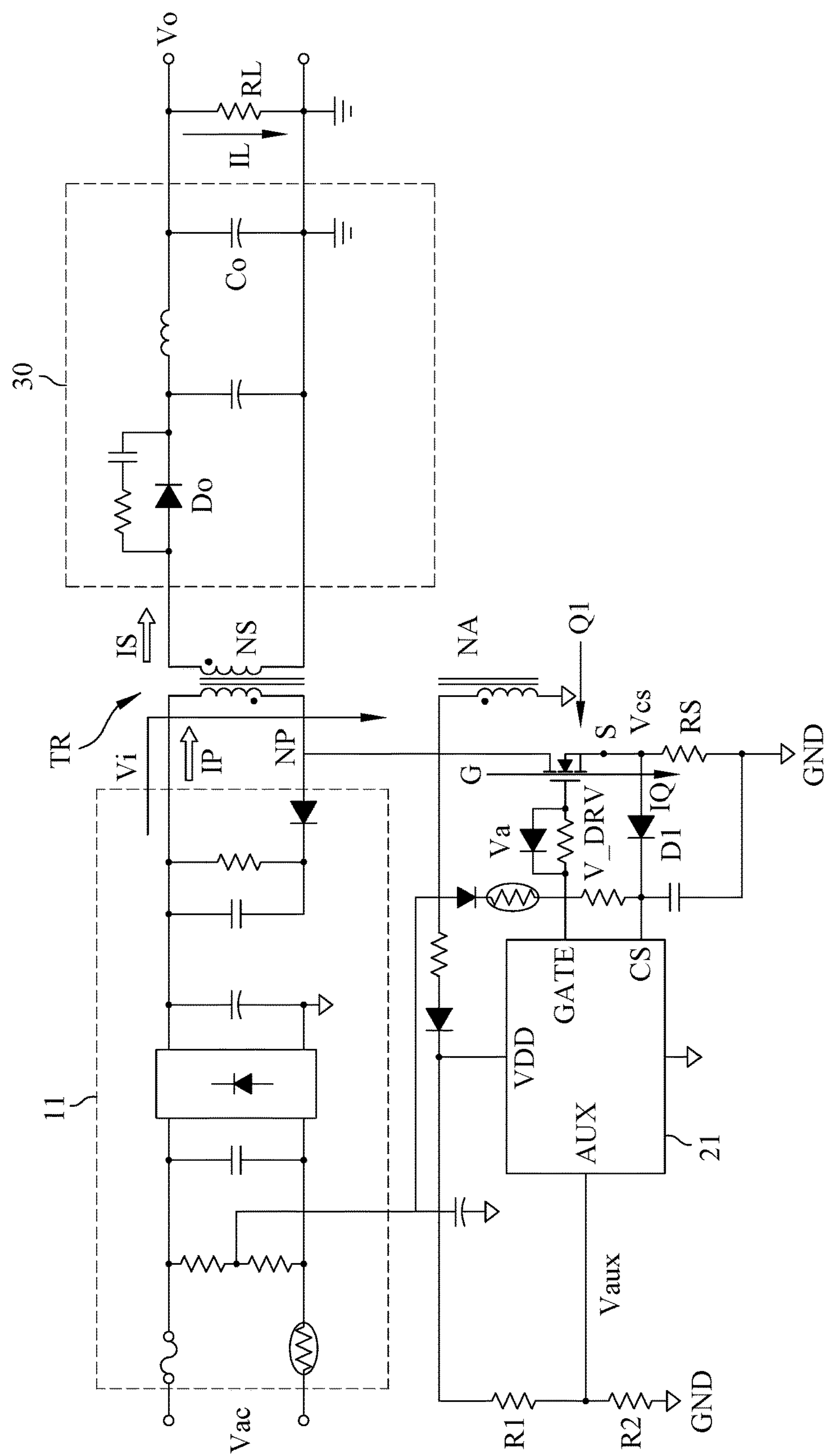
FIG. 7 is one exemplary electrical circuit for implementing the method according to the second embodiment of the present invention.
Figure 8:
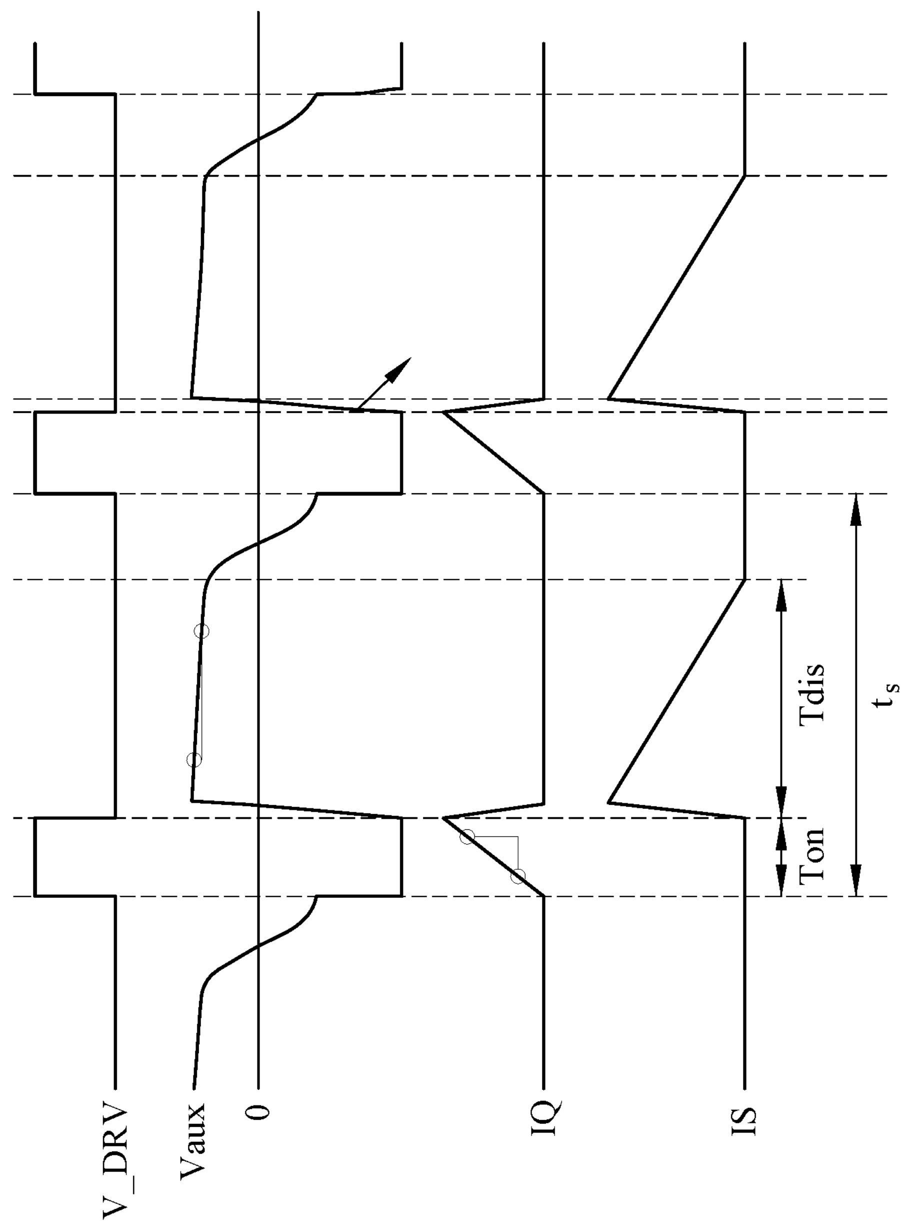
FIG. 8 is one exemplary operation waveform of the method according to the second embodiment of the present invention.

Please further refer to FIGS. 6 and 7. Specifically, FIG. 6 shows a flowchart of a method of acquiring input and output voltage information according to the second embodiment of the present invention, and FIG. 7 is one exemplary electrical circuit for implementing the method according to the second embodiment of the present invention. Moreover, also refer to FIG. 8 illustrating one exemplary operation waveform of the method according to the second embodiment of the present invention.

As shown in FIGS. 6 and 7, the method according to the second embodiment of the present invention comprises the steps S20, S21, S22, S23, S24, and S25, which are sequentially performed and similar to the first embodiment as shown in FIG. 3. One primary difference between the first and second embodiments is that the step S24 of the second embodiment receives the auxiliary voltage instead of the current-sensing signal in the step S14 of the first embodiment. Further, the circuit shown in FIG. 7 for the second embodiment is different from the circuit shown in FIG. 4 for the first embodiment.

Specifically, the exemplary circuit shown in FIG. 7 for illustrating the method according to the second embodiment of the present invention substantially comprises an input power unit 11, a transformer TR, an auxiliary winding NA, a PWM controller 21, a switch element Q1, a current-sensing resistor RS, a first rectifier D1, and an output unit 30 for converting an AC input power Vac into an output power Vo supplying an external load RL. The transformer TR comprises a primary winding NP and a secondary winding NS, and the output unit 30 at least comprises an output rectifier Do and an output filter Co connected in series.

Furthermore, the input power unit 11 receives and converts the AC input power Vac into a rectified input power Vi through rectification and filtration. The primary winding NP, the switch element Q1, and the current-sensing resistor RS are connected in series and disposed between the input power unit 11 and a ground level GND. The first rectifier D1 is connected between a current-sensing terminal CS of the PWM controller 21 and a source S of the switch element Q1. A connection point of the auxiliary winding NA and the current-sensing resistor RS is connected to the ground level GND. The secondary winding NS generates an induced current through induction with a current flowing through the primary winding NP, and the induced current flows into the output unit 30. Thus, the output power Vo is generated at the output filter Co.

However, it should be noted that the circuit shown in FIG. 7 is a flyback converter, and just illustrative for clearly explaining the aspects of the present invention, but not intended to limit the scope of the present invention. In other words, other circuits which need to detect the input voltage and are driven by means of PWM should be also included.

Preferably, the above input power unit 11 is implemented by but not limited to a bridge rectification device, and the switch element Q1 is implemented by but not limited to a power Metal-Oxide-Semiconductor Field Effect Transistor (MOSFET) or a power Bipolar Junction Transistor (BJT). Further, the output rectifier Do is implemented by but not limited to a rectifying diode or a synchronous rectifier, and the first rectifier D1 is implemented by but not limited to a rectifying diode or a synchronous rectifier.

More specifically, the method of the second embodiment begins at the step S20, in which the PWM controller 21 generates a PWM driving signal V_DRV to turn on the switch element Q1 through the PWM driving terminal DRV of the PWM controller 21. At this time, the turn-on current IQ is a primary side current IP and flows from an output terminal of the input power unit 11 through the primary winding NP, the switch element Q1, and the current-sensing resistor RS to a low voltage terminal of the input power unit 11, which is the ground level GND. Then, the PWM controller 21 enters the step S21 and receives the sensed voltage as a current-sensing signal generated by the current-sensing resistor RS, and particularly, the sensed voltage is calculated according to the formula specified by –IQ*RS1, where IQ represents the turn-on current, and RS1 is resistance of the current-sensing resistor RS. After the preset turn-on time Ton, the PWM controller 22 performs the step S22 to calculate the input voltage Vin of the rectified input power Vi, which is equal to the present sensed voltage. The principle for calculation is then described in detail. If power consumption of the primary winding NP, the switch element Q1, the auxiliary winding NP is negligible, the input voltage Vin of the rectified input power Vi is equal to the sensed voltage of the current-sensing resistor RS. Then, the step S23 is performed to turn off the switch element Q1.

In the step S24, the PWM controller 21 receives an auxiliary voltage Vaux from the auxiliary winding NA. Specifically, an auxiliary winding voltage Va is generated by the auxiliary winding NA through induction of the secondary current flowing through the secondary winding NS, and the auxiliary winding voltage Na is divided by the first voltage divider R1 and the second voltage divider R2 such that a voltage at the connection point of the first voltage divider R1 and the second voltage divider R2 is just identical to the auxiliary voltage Vaux. The auxiliary voltage Vaux, the auxiliary winding voltage Va, the first voltage divider R1 and the second voltage divider R2 are related by the formula: Va=Vaux*(1+R2/R1). The principle is that when the switch element Q1 is turned off, the turn-on current IQ flows through the current-sensing resistor RS and fast decreases to zero, and the secondary winding NS induces a secondary current IS to supply the load current IL. At this time, the auxiliary winding NA generates the auxiliary voltage Vaux through induction with the secondary current IS of the secondary winding NS.

As the secondary current IS gradually discharges to zero, the auxiliary voltage Vaux also gradually decreases. For the discontinuous conduction mode (DCM), when the secondary current IS decreases to zero, the auxiliary winding NA generates the auxiliary voltage Vaux fast decreases because the auxiliary winding NA fails to sustain the auxiliary voltage Vaux. The time when secondary current IS decreases to zero is generally called Knee point. When it comes to the continuous conduction mode (CCM), the switch element Q1 is turned on before the secondary current IS decreases to zero. It is obvious that the auxiliary voltage Vaux will gradually decrease for DCM or CCM, and the PWM controller 21 calculates the decreasing slope of the auxiliary voltage Vaux.

Figure 9:
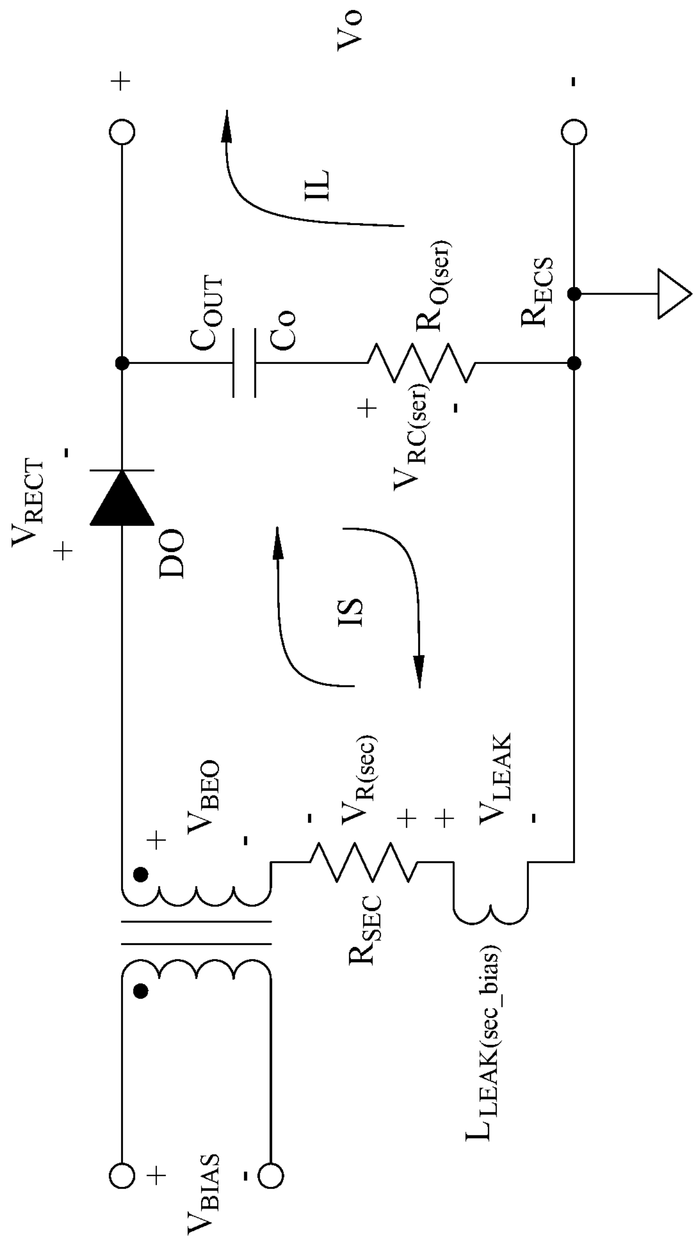
FIG. 9 is a view showing part of the circuit in FIG. 7.
Figure 10:
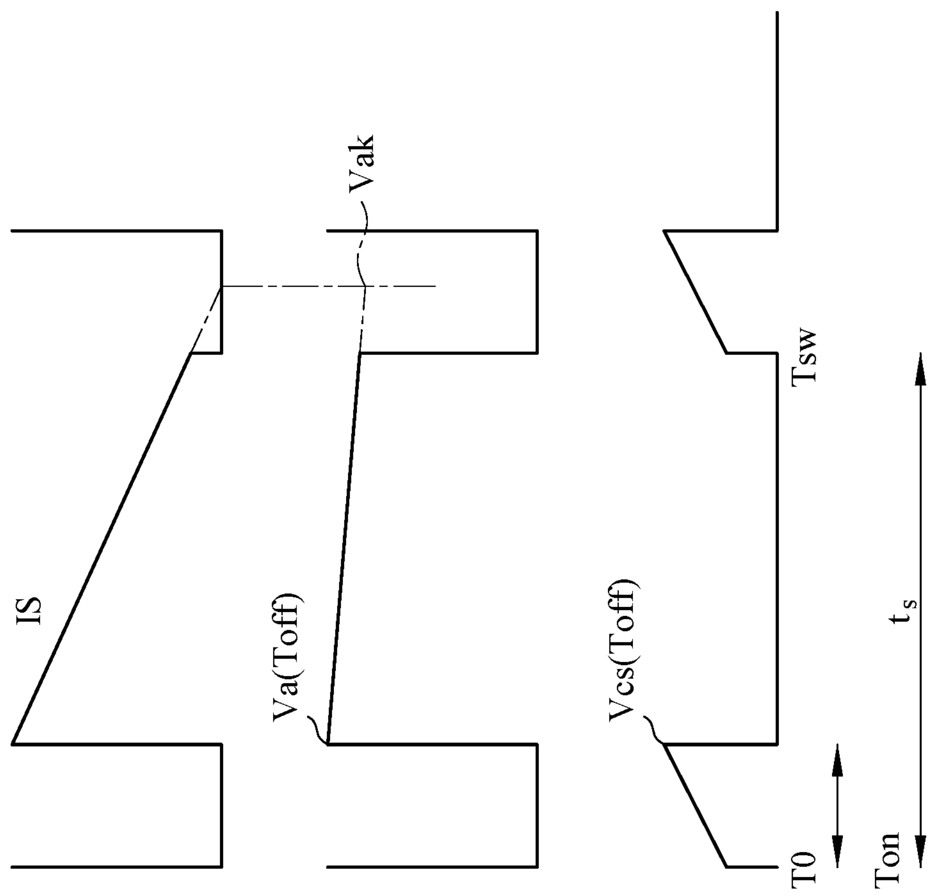
FIG. 10 is a view showing part of the circuit in FIG. 7.

Finally, the PWM controller 21 performs the step S25 to calculate the output voltage Vout. To clearly explain the principle of calculation, refer to FIGS. 9 and 10. Specifically, FIG. 9 shows part of the circuit in FIG. 7, including the equivalent serial resistance $R_{CES}$ of the output capacitor Co, and the equivalent serial resistance $R_{SEC}$ and leakage inductance $L_{LEAK}$ of the primary winding NP. FIG. 10 shows the waveform of the secondary current IS, the auxiliary winding voltage Va, and the current-sensing voltage Vcs. It should be noted that the relationship between the auxiliary voltage Vaux in FIG. 8 and the auxiliary winding voltage Va in FIG. 10 is easily acquired from the circuit shown in FIG. 7. However, the auxiliary winding voltage Va is approximately Vaux*(1+R2/R1), if resistance from the auxiliary winding NA to the connection point of the first voltage divider R1 and the second voltage divider R2 is negligible and the influence of the diode is little. Specifically, the output voltage Vout is calculated by the formula: Vout=Vak=Va(Toff)–K*Vcs(Toff), where Toff is the time when the switch element Q1 is turned off by the PWM driving signal V_DRV, Va(Toff) is the peak voltage of the auxiliary winding voltage Va after the time Toff, Vcs(Toff) is the peak voltage at the current-sensing terminal CS before the switch element Q1 is turned off by the PWM driving signal V_DRV, K is a constant, and Vak is the Knee point of a virtual auxiliary winding voltage. Substantially, Vak is the auxiliary winding voltage Va when the switch element Q1 is turned off and the secondary current IS drops to zero. That is, Vak is the output voltage Vout. K is determined by another formula specified by $WP*WA/WS^2*(RSEC+RCES)/RS1$, where WP is the winding number of the primary winding NP, WS is the winding number of the secondary winding NS, and WA is the winding number of the auxiliary winding NA.

Obviously, one feature of the second embodiment of the present invention is that the output voltage is acquired from the decreasing slope of the auxiliary voltage without and voltage divider, particularly for CM and CCM. The method does not only simplify the circuit design and reduce power consumption, but also greatly improve stability and reliability of the whole electrical operation.

From the above mention, the methods provided by the present invention can directly senses the voltage slope (equivalent to the current slope) to detect and calculate the input voltage, and employs the variation of the auxiliary voltage slope to detect and calculate the output voltage, thereby greatly decreasing power consumption at no load and increasing efficiency of electrical operation, In particular, no voltage divider is needed to detect the input voltage and the output voltage such that the overall operation of the electrical circuit is dramatically improved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method of acquiring input and output voltage information performed by a pulse width modulation (PWM) controller in collocation with an input power processing unit, a primary inductor, an auxiliary inductor, a switch element, a current-sensing resistor, an output rectifier, and an output filter for converting an alternating current (AC) input power into an output power supplying an external load, the input power processing unit receiving and converting the AC input power into a rectified input power through rectification and filtration, the PWM controller utilizing a current-sensing signal to obtain related inform about an input voltage of the rectified input power and an output voltage of the output power, the primary inductor, the switch element, and the current-sensing resistor connected in series and disposed between the input power processing unit and a current-sensing terminal of the PWM controller, a drain of the switch element connected to the primary inductor, a gate of the switch element connected to a PWM driving terminal of the PWM controller, a source of the switch element connected to a current-sensing terminal of the PWM controller, the current-sensing resistor disposed between the source of the switch element and the ground level, the output rectifier and the output filter connected in series and disposed between the primary inductor and the ground level, the output power generated at a connection point of the output rectifier and the output filter, the method comprising:

an initial step generating a PWM driving signal to turn on the switch element through the PWM driving terminal, a turn-on current flowing from an output terminal of the input power processing unit to the ground level through the primary inductor, the switch element, and the current-sensing resistor, the output rectifier turned off;

the current-sensing terminal receiving a sensed voltage as a current-sensing signal generated by the current-sensing resistor when the turn-on current flowing through the current-sensing resistor;

the current-sensing terminal of the PWM controller receiving and detecting the turn-on current as a peak turn-on current after a period of turn-on time, the peak turn-on current divided by the turn-on time to obtain an increasing slope of the turn-on current during the period of turn-on time, the increasing slope further multiplied by an inductance of the primary inductor to acquire the input voltage;

the PWM controller updating the PWM driving signal to turn off the switch element, a loading current flowing from the output terminal of the input power processing unit to the ground level through the primary inductor, the output rectifier, and the load connected to the output filter in parallel;

the turn-on current starting to decrease when the switch element turned off, the current-sensing signal received by the current-sensing terminal being monitored to determine if the turn-on current drops to zero, a period from the time when the switch element turned off to the time when the turn-on current zero being called a zero time; and the peak turn-on current being divided by the zero time to obtain a decreasing slope of the turn-on current, the decreasing slope further multiplied by the inductance of the primary inductor and added by the input voltage to acquire the output voltage.

2. The method as claimed in claim 1, wherein the input power processing unit is implemented by a bridge rectification device formed of four rectifying diodes.

3. The method as claimed in claim 1, wherein the switch element is implemented by a power Metal-Oxide-Semiconductor Field Effect Transistor (MOSFET) or a power Bipolar Junction Transistor (BJT).

4. The method as claimed in claim 1, wherein the output rectifier is a rectifying diode or a synchronous rectifier, and the output filter is an electrical capacitor.

5. A method of acquiring input and output voltage information performed by a PWM controller in collocation with an input power unit, a transformer, an auxiliary winding, a switch element, a current-sensing resistor, a first rectifier, and an output unit for converting an AC input power into an output power supplying an external load, the transformer comprising a primary winding and a secondary winding, the output unit at least comprising an output rectifier and an output filter connected in series, the input power unit receiving and converting the AC input power into a rectified input power through rectification and filtration, the primary winding, the switch element, and the current-sensing resistor connected in series and disposed between the input power unit and a ground level, the first rectifier connected between a current-sensing terminal of the PWM controller and a source of the switch element, a connection point of the auxiliary winding and the current-sensing resistor connected to the ground level, the secondary winding generating an induced current through induction with a current flowing through the primary winding, the induced current flowing into the output unit, the output power generated at the output filter, the method comprising:

the PWM controller receiving a sensed voltage as a current-sensing signal generated by the current-sensing resistor, the sensed voltage being calculated according to a formula specified by $-IQ*RS1$, where IQ representing the turn-on current, and RS1 being resistance of the current-sensing resistor;

the PWM controller calculating an input voltage of the rectified input power equal to the present sensed voltage;

the switch element being turned off;

the PWM controller receiving an auxiliary voltage from the auxiliary winding, an auxiliary winding voltage generated by the auxiliary winding through induction of the secondary current flowing through the secondary winding, the auxiliary winding voltage being divided by the first voltage divider and the second voltage divider, a voltage at the connection point of the first voltage divider and the second voltage divider being identical to the auxiliary voltage; and the PWM controller calculating the output voltage of the output power based on a formula, wherein the formula is specified by Vout=Va(Toff)−K*Vcs(Toff), Vout is the output voltage, Toff is the time when the switch element is turned off by the PWM driving signal, Va(Toff) is the peak voltage of the auxiliary winding voltage after the time Toff, Vcs(Toff) is the peak voltage at the current-sensing terminal before the switch element is turned off by the PWM driving signal, K is a constant determined by another formula specified by $WP*WA/WS^2*(RSEC+RCES)/RS1$, WP is the winding number of the primary winding, WS is the winding number of the secondary winding, and WA is the winding number of the auxiliary winding.

6. The method as claimed in claim 5, wherein the input power unit is implemented by a bridge rectification device.

7. The method as claimed in claim 5, wherein the switch element is implemented by a power MOSFET or a power BJT.

8. The method as claimed in claim 5, wherein the output rectifier is a rectifying diode or a synchronous rectifier, and the first rectifier is a rectifying diode.

* * * * *